United States Patent Office 3,011,436
Patented Dec. 5, 1961

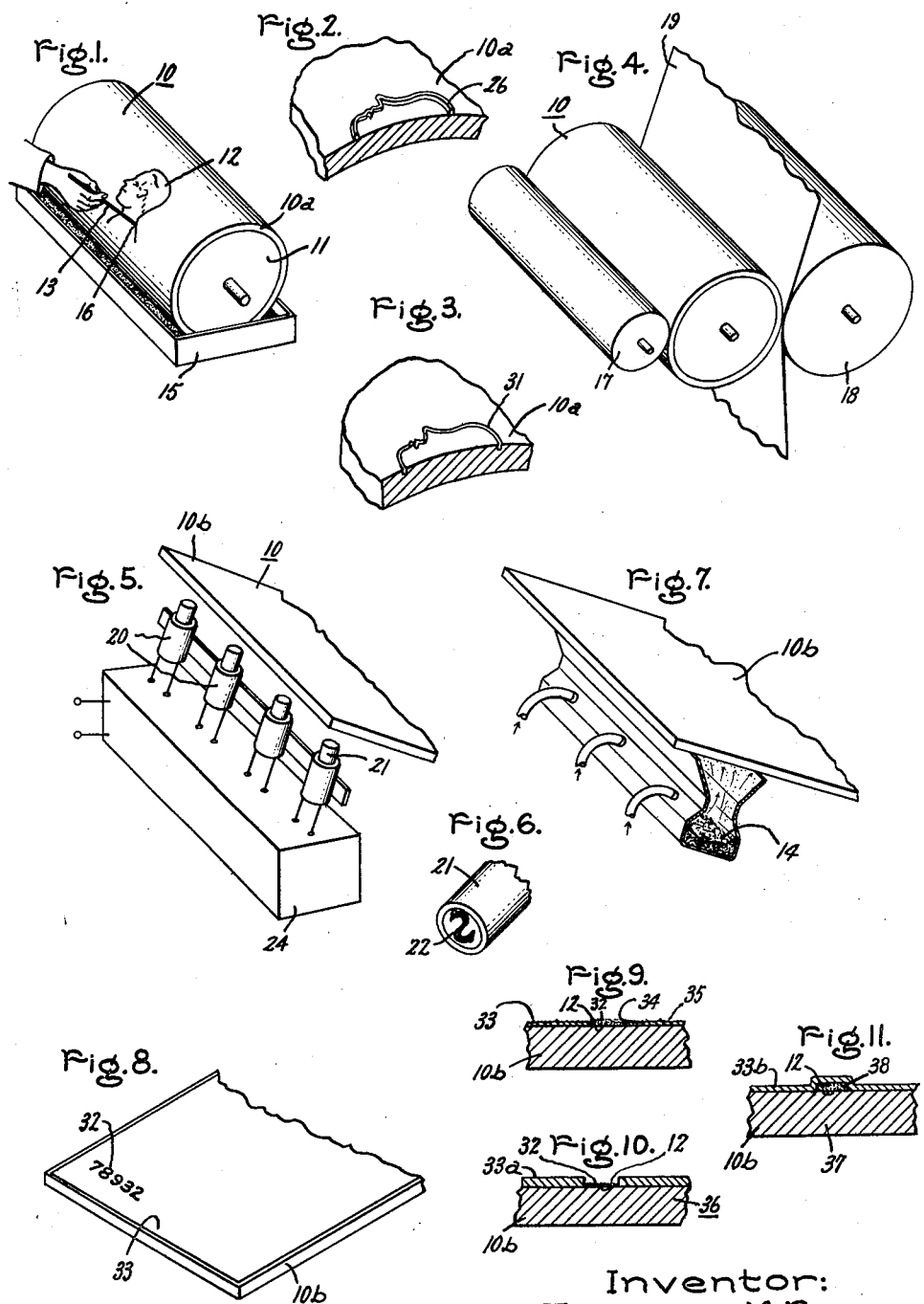

3,011,436
METHODS OF MAKING PRINTING PLATES
Theodore M. Berry, deceased, late of Schenectady, N.Y., by Albert L. Berry, administrator, Jewell, Kans., assignor to General Electric Company, a corporation of New York
Filed Sept. 30, 1953, Ser. No. 383,211
14 Claims. (Cl. 101—401.1)

The invention relates to methods and apparatus for producing pictorial reproductions, and more particularly to metallic plates suitable for use in letterpress, gravure, and lithographic printing processes, and to methods of making the same.

Modern methods of making printing plates have become quite complicated involving many laborious, time-consuming and highly technical processes. Among the more bothersome and expensive of these processes are those of manually or mechanically setting metallic type and photographically producing matrices or transparencies for guiding and controlling etching of the printing plate.

Accordingly, one object of the invention is to provide a new method of making letterpress, gravure, or lithographic printing plates, which new method is faster, more direct and less expensive than conventional methods; and to provide new types of printing plates made in accord with this new method.

Another object of the invention is to provide a new method of making ink-supporting physical representations, such as relief, engraved, or surface expressions of numbers or letters in a metallic plate without the necessity of using complicated mechanical typesetters.

A further object of the invention is to provide a new method of producing an ink-supporting physical representation, such as relief, engraved or surface expressions of characters, pictures, paintings, or other irregular portrayals directly upon a metallic plate to be used as the printing plate itself.

In general, in accord with the invention, a latent magnetic image of the desired character or picture is formed upon a plate of high retentivity magnetic material, the magnetized plate is brought into close proximity or contact with minute magnetic particles which adhere to the plate in the configuration of the impressed magnetic image, and these adhering magnetic particles are utilized to form a permanent, rigid, ink-supporting physical representation, either in relief, gravure or at surface level, of the latent magnetic image upon the magnetic plate. In making a relief-type printing plate, the adhering particles are cementitiously bonded to each other and to the magnetic plate or are utilized to produce a raised representation of the magnetic image in a metal sheet electroplated upon the magnetic plate. In making a gravure-type printing plate, the adhering particles are utilized to carry an etchant which engraves the magnetic plate, or are utilized to mask out an impression of the magnetic image in a fairly thick metal sheet electroplated upon the magnetized plate. In making a lithographic printing plate, the adhering particles are utilized to mask out a portrayal of the magnetic image in a thin electroplated coating of a metal having dissimilar transfer properties when wetted than the magnetized plate relative to oil or grease based inks. Such lithographic plates may also be used, in accord with the invention, with magnetic inks.

The method of producing a latent magnetic image upon a plate of high retentivity magnetic material, as well as the method of developing this magnetic image by bringing minute magnetic particles into the magnetic attracting influence of the plate containing the impressed magnetic image forms a portion of the subject matter of patent application, Serial No. 223,423, entitled "Recording and Portraying Method and Apparatus," filed April 27, 1951, now abandoned, and assigned to the same assignee as the present invention.

The novel features which are believed characteristic of the invention are set forth in the appended claims. The invention itself, however, together with further objects and advantages thereof can best be understood by reference to the following description taken in connection with the accompanying drawing in which:

FIG. 1 is a perspective view of a printing plate in an initial stage of production in accord with the invention;

FIG. 2 is an enlarged perspective view, partly in section, of a relief-type printing plate made in accord with the invention;

FIG. 3 is an enlarged perspective view, partly in section, of a gravure type printing plate made in accord with the invention;

FIG. 4 is a perspective schematic diagram of the printing components of a printing machine illustrating one manner of using the printing plate of the invention in conventional printing apparatus;

FIG. 5 is a diagrammatic perspective view of apparatus for forming a latent magnetic image of letters or numbers on a magnetic plate in accord with the invention;

FIG. 6 is an enlarged perspective view of a character plug employed in the magnetic image producing apparatus of FIG. 5;

FIG. 7 is a perspective diagrammatic view of apparatus for developing the magnetic image impressed upon the magnetic plate by the apparatus of FIG. 5;

FIG. 8 is a perspective view of a bimetallic printing plate suitable for lithography made in accord with the invention;

FIG. 9 is an enlarged sectional view of the lithographic plate of FIG. 8;

FIG. 10 is a cross-sectional view of a gravure printing plate made in a manner similar to that of the lithographic plate of FIG. 8; while FIG. 11 is an enlarged cross-sectional view of a relief-type printing plate also made in a manner similar to that of the lithographic plate of FIG. 8.

In the drawing, similar components are designated by the same reference numerals.

Referring to FIG. 1 there is illustrated the initial steps involved in practicing the new method of making printing plates. A smooth surfaced ferromagnetic member 10 of high magnetic retentivity such as alnico, cunife (60% copper, 20% nickel, and 20% iron) or cunico (50% copper, 21% nickel, and 29% cobalt), shown in FIG. 1 as a cylinder 10a is supported around the surface of a cylindrical core such as a soft iron drum 11, and a latent magnetic image 12 of the picture or character desired to be printed is impressed upon this magnetically retentive ferromagnetic cylinder 10a by a suitable magnetizing member 13. A magnetic image developing material 14 is supported within a bin 15 in tangential contact with the surface of cylinder 10a and comes in contact with the latent magnetic image 12 upon rotation of drum 11 and of cylinder 10a carried thereon. Image developing material 14 conveniently comprises comminuted magnetic particles such as minute iron filings or iron oxide powder, and may be suspended in a liquid or mixed with other dry powders for specific purposes to be more fully described hereinafter.

The word "ferromagnetic" is herein employed to define a substance whose magnetic permeability is considerably above that of air and varies at different values of flux density. Ferromagnetic materials have the very marked magnetic effects exhibited, for example, by iron, nickel, and cobalt. The expression "magnetic retentivity" herein employed defines the ability of a magnetic material to retain its magnetization once it is magnetized. More technically, ferromagnetic materials have "high magnetic retentivity" in the sense used above when the material has high coercivity, preferably above 100 oersteds, and a high external maximum energy product; the "coercivity" being the magnetic force which must be applied in a reverse direction to a magnetized body to remove its residual magnetism, and the maximum energy product being the maximum product of the flux density and the coercive force occurring during any magnetized condition of the material. The term "magnetic image" is herein employed to define a region of localized magnetization in a ferromagnetic member. The word "image" is particularly apt because the configuration of the magnetizing field determines the configuration of the resultant localized magnetization of the ferromagnetic member, which magnetization may thus be appropriately described as a magnetic reproduction or "image" of the magnetizing field.

Magnetizing member 13 may conveniently be a permanent magnet stylus arranged to have a concentration of magnetic lines of force emanting from the stylus tip 16. The image to be reproduced may be manually delineated on the surface of magnetic cylinder 10a as shown. A tissue tracing of the picture may be spread over the surface of magnetic cylinder 10a to aid the artist in the formation of the magnetic image. Any highly and permanently magnetizable material such as an alloy of aluminum, nickel, and cobalt of the type known as "alnico" is suitable for the permanently magnetized stylus 13.

In order that the artist may be able to inspect and correct the magnetic image reproduction of the picture desired to be printed, drum 11 may from time to time be rotated so that the finished portion of image 12 comes in contact with the comminuted magnetic developing material 14. As the portion of ferromagnetic cylinder 10a containing the magnetic image 12 passes in contact with or in the vicinity of the developing material 14, particles of material 14 are magnetically attracted to the locally magnetized surface of cylinder 10a and arrange themselves to assume the form and outline of the magnetic image 12 impressed thereon. As cylinder 10a is further rotated and emerges from the comminuted material 14, visible lines of magnetic particles corresponding to the lines of the magnetic image formed by stylus 13 continue to adhere to the magnetized image of the surface of cylinder 10a, and a "development" of the magnetic image 12 is thus produced.

An alternative method of impressing a latent magnetic image upon a ferromagnetic member 10 is shown in connection with FIG. 5. This method enables the delineation of images of different controlled magnetic intensity and is also particularly well suited to the image delineation of numbers or letters. Referring to FIG. 5, a linear array of electromagnets 20, each having a magnetic core 21 terminating in a raised number or letter 22, are arranged in proximity with a line on the surface of a high retentivity ferromagnetic member 10 shown as a flat plate 10b. Plate 10b is moved back and forth over the array of electromagnets 20 and a selected electromagnet is energized by means of a suitable switching circuit 24 whenever magnetic plate 10b reaches a desired position aligned with this electromagnet along the line of print. The energization of the electromagnet instantly impresses a magnetic image of the configuration of the raised character 22 of the core of this electromagnet upon the high retentivity magnetic plate 10b. The intensity of the magnetization may be easily controlled by merely varying the amplitude of current flowing through the coil of the electromagnet. Other more complicated and higher speed systems for producing latent magnetic images of numbers or letters upon ferromagnetic members are disclosed and claimed in above-identified patent application, Serial No. 223,423.

The magnetic image impressed upon plate 10b may then be developed by dipping plate 10b within developing material 14 as illustrated in FIG. 1 or by causing the comminuted developing material 14 to spray against the imaged surface of plate 10b under the force of suitable air pressure as illustrated in FIG 7. The magnetic particles 14 that are sprayed against the imaged surface of the plate 10b adhere to the plate only where a magnetized image has been formed thereon, the remaining particles being blown from the surface of member 10b or falling from the surface under the force of gravity. Other techniques for developing the magnetic image are disclosed and claimed in above-identified patent application, Serial No. 223,423. It will be appreciated that although the ferromagnetic member is shown in FIG. 5 as a flat plate 10b it may alternatively be in the form of a cylinder 10a as shown in FIG. 1 or in the form of a thin sheet of flexible high retentivity magnetic material, such as cunife, which may be wrapped around a cylinder for use in a printing press.

In order to erase and correct any undesired lines in magnetic image 12 as developed by contact with material 14, another "demagnetizing" stylus (not shown) may be used having a permanent magnetization in an opposite direction to that of stylus 13 and having a magnetic field strength sufficient to counteract the magnetization of image 12 but insufficient to magnetize cylinder 10a in an opposite direction. Alternatively, an electromagnetic stylus operated with a diminishing alternating current may be used to demagnetize the undesired portions of image 12. Such demagnetizing apparatus may be placed in contact with those lines that are desired to be erased and function to counteract the magnetizing effect of the previously applied magnetizing stylus 13. The desired magnetic image may thus be delineated, proofed, and corrected, all upon the ferromagnetic cylinder 10 that is ultimately to function as the metallic base for the printing plate itself.

After the desired latent magnetic image 12 is completely delineated upon the surface of cylinder 10a and is developed by immersion within developing material 14, the magnetic particles comprising material 14 adhering to the magnetic image 12 may then in accord with techniques described and claimed in above-identified copending application, Serial No. 223,423, be directly transferred to a print receiving sheet or paper thereby to produce a direct pictorial reproduction. In accord with the present invention, however, these adhering magnetic particles are not themselves transferred to a print receiving member, but rather are utilized to transform ferromagnetic member 10 into a permanent ink-supporting printing plate which, as shown in FIG. 4, may be inked by conventional means such as inking roll 17 and then employed in conventional printing presses 18 to transfer the inked image to a print receiving receiving sheet 19.

In accord with the present invention, the adhering magnetic particles are utilized in a number of different ways to transform ferromagnetic members 10 into suitable printing plates. In making a relief-type printing plate, the magnetic particles included in developing material 14 and adhering to image 12 are utilized to carry a cementitious material which under suitable treatment causes the magnetic particles rigidly to bond together and to the surface of ferromagnetic member 10 thereby to form a permanent, rigid, raised physical representation 26, best seen in FIG. 2, of the magnetic image whose edge may be used as an ink-receiving and supporting surface in the manner of conventional relief-type printing plates. In accord with this method, the developing material 14 comprises comminuted magnetic particles such as iron oxide powder mixed with a dry powder of cementitious material such as a powder of suitable adhesives, thermoplastics, or natural resins to be more fully described hereinafter. These powdered cementitious materials adhere to the comminuted magnetic particles, for example, by electrostatic attraction and are carried thereby to adhere to the magnetized image on the surface of the ferromagnetic member 10. Alternatively, the magnetic particles 14 may be coated with a thermal or air-hardened adhesive coating which is sprayed in a conventional "spraying tower" or otherwise applied to the particles while in a liquid state. The developed surface of the magnetic member 10 containing the adhering magnetic particles which carry or are coated with the cementitious material is then heat treated to a temperature at which the cementitious material becomes glutinous and mutually adherent, whereupon the heat is removed and the cementitious material allowed to harden and bond the magnetic particles together and to the surface of ferromagnetic member. The raised, hardened magnetic characters or physical representations 26 formed in relief upon the surface of plate 10 have an upraised thickness depending primarily upon the intensity of magnetization of image 12, which, in turn, determines the amount of comminuted material adhering to the image. A strongly magnetized image having a sharp gradient magnetic field of the order of 5000 gauss has been found to produce a raised physical representation of the letter or picture image having an upraised thickness of about 0.01 inch. The up-raised picture or character thus produced has sufficient thickness to be inked preferentially relative to the surface of ferromagnetic member 10 and to produce a sharply defined print or transfer of the ink carried on the surface of this up-raised physical representation upon a paper sheet or other print receiving member 19. The contact pressures in inking should, of course, be quite light in order that only the surface of the raised characters or pictures are inked.

The cementitious powder to be mixed with the magnetic particles to form the developing material 14 for the relief-type plates described above may comprise an adhesive of the type known commercially as Redux, manufactured by the Ciba Company. Such an adhesive may comprise, for example, a combination of phenolic resins, such as phenol-formaldehyde or resorcinal formaldehyde, with a polyvinyl formal or butyral. Alternatively, the cementitious material may comprise a powdered thermoplastic such as polyvinyl acetate, polymethyl methacrylate, or ethyl cellulose. Certain natural resins may also be used, for example, powdered shellac, asphalt, or "dragon's blood." It will be appreciated that the cementitious material should be one which begins to bond or stick to ferromagnetic member 10 at temperatures below the Curie point of the magnetic particles of developing material 14 in order that they do not become demagnetized and fall away from image 12 before they become cementitiously bonded to ferromagnetic member 10.

In order to make a gravure plate such as shown in FIG. 3 rather than a relief plate such as described above, a developing material 14 may be used which comprises a mixture of minute magnetic particles and a dry acid powder which upon moistening becomes an etchant for the ferromagnetic member 10. For this purpose material 14 may, for example, comprise a mixture of powdered iron filings and a powdered acid anhydride such as anhydrous phosphoric acid, $P_2O_5$ while member 10 comprises a nickel alloy such as alnico, cunife, or cunico. This mixture of iron filings and dry acid is kept in a dehydrated atmosphere while the magnetized ferromagnetic member 10 is immersed or otherwise brought into contact therewith. The ferromagnetic member 10 with the powdered mixture adhering thereto in the form of the magnetic image 12 is then transferred into a moisture laden compartment whereupon the passive acid powder absorbs moisture and becomes an active agent reacting with the surface of member 10 to produce an engraved physical representation 31 of the image. The portions of the image which are more heavily magnetized and which carry a greater amount of adhering magnetic particles and powdered acid etchant are, upon moistening, engraved to a deeper extent than the portions that are more lightly magnetized. In this way variations in the depth of engraving may be produced such that the gravure plate can produce gradations in tone and intensity of the printed picture. The etching powder carried by the adhering particles may, upon moistening, attack the magnetic iron particles as well as the surface of member 10, but the evolved gas resulting from such acid attack of the magnetic particles will not seriously mar or mask the delineation of the engraved impression 31 in the ferromagnetic member.

After the etching process has been completed, the entire printing plate is washed and scrubbed in clean water whereupon the remaining iron filings are removed and a sharp clear permanent impression 31 is left engraved in the surface of ferromagnetic member 10. The engraved impression 31 may have a depth varying from 0.001 inch to 0.01 inch, and may be easily inked and employed in printing in the same manner as conventional gravure plates.

Although as described above, the magnetic particles may be mixed with a dry acid etchant and then moistened in order to become active, it is also possible to employ iron particles suspended in a liquid etchant which does not attack the iron particles used but which does attack and etch the ferromagnetic member 10 when brought in contact therewith. If pure iron filings or iron oxide powder (magnetite) is employed as the comminuted magnetic material and a strong concentration (for example, about 50% solution) of nitric acid employed as the liquid etchant, the iron particles suspended within such liquid etchant are not attacked by the nitric acid. If the ferromagnetic member carrying the magnetized image 12 is then brought into close proximity, for example within 0.005 inch of the surface of the nitric acid suspension of these particles, the magnetic image attracts the magnetic particles across this slight air gap and these magnetic particles carry the nitric acid with them. If copper or nickel alloys, such as alnico, cunife or cunico are used for ferromagnetic member 10, the nitric acid acts upon and etches such ferromagnetic member 10 in the form of the magnetic image. This method, however, requires that the magnetic member 10 be strongly magnetized in order that the resultant magnetic image may have a remanent magnetic field of the order of 5000 gauss so that the image will have sufficient attractive force to cause the magnetic particles to break the surface tension of the nitric acid and jump across the slight air gap to adhere to this strongly magnetized image.

In order to make a bimetallic lithographic plate, the image developing material 14 employed is preferably composed of a pulverized non-conducting magnetic powder such as magnetite, i.e. magnetic iron oxide powder. After the magnetic image 12 is formed on ferromagnetic member 10 and developed by such magnetite powder, the entire surface of the member, with the exception of the developed image, is then electroplated with a metal such as chromium which, when properly grained, holds water. As shown in FIG. 9 the developed magnetic image containing the adhering non-conducting magnetic particles 32 prevents the electro-deposition of the chromium wherever the magnetic particles 32 adhere to the ferromagnetic member 10. Only a thin film 33, for example less than 0.001 inch thick, of chromium or other water supporting metal is electroplated upon the surface of magnetic cylinder 10. After the electroplating process is completed, the iron particles adhering to the magnetic image 12 are either flushed or cleaned off and, if desired, the image may be demagnetized to aid in the cleaning process. Shallow wells or impressions 34 are left in the surface of ferromagnetic member 10 where the magnetic particles had been. The surface of chromium plate 33 may then be suitably grained or roughened by grinding with a quartz powder or by other well-known techniques to form small grains or surface pockets 35 which support and hold water. The shallow wells or impressions 34 left by the removed iron oxide powder hold oil or grease-based inks and may be re-inked by conventional lithographic inking methods, since the wetted surface of chromium plate 33 does not retain such oil or grease-based inks.

The adhering magnetic particles 32 may also be used to guide and control the electroplating of a gravure-type printing plate 36 as in FIG. 10 or a relief-type printing plate 37 as in FIG. 11. In making the gravure-type plate 36 the magnetic particles employed are non-conducting in nature, for example iron oxide powder such as employed in making the lithographic plate of FIG. 9, but the plated layer 33a is preferably much thicker, for example about 0.010 inch instead of a very thin layer as in the lithographic plate of FIG. 9. The metal that is electroplated upon the surface of ferromagnetic member 10 need not be one which holds water when grained but may be any rigid smooth metal such as nickel, chromium or copper. In making such electroplated gravure plates, it is preferable that the magnetic image 12 not be demagnetized and that inks containing magnetic particles be employed. Such "magnetic inks" will be readily retained within the electroplate-bounded impression by the magnetic image of the ferromagnetic member 10.

In making a relief-type printing plate by electroplating over the magnetic particles as shown in FIG. 11, the adhering magnetic particles 38 must be electrically conducting in nature, for example pulverized iron filings. The entire conducting surface of the magnetic plate 10 is immersed within an electroplating bath and a very thin film 33b of metal such as copper or chromium is electroplated over the surface including the surface of the conducting particles as illustrated in FIG. 11. The electroplated film 33b must be quite thin, for example of the order of .001 inch, in order not to destroy the clear delineation of the raised magnetic impression. The metal strengthens and rigidifies the raised image to an extent that it will withstand the required printing pressures. The raised relief electroplated impression is then employed to carry ink upon its surface and to transfer such ink to a print receiving member in the same manner as conventional relief-type plates.

It will thus be seen that there is provided a new method of making relief, surface, or engraved printing plates which utilizes the comminuted magnetic particles adhering to a magnetic image, either to carry an agent for producing the relief, engraved, or surface matrix, or which utilizes the adhering particles as a guide and control for an electroplating process for producing such relief, engraved, or surface expressions. The resulting printing plates may have high-definition qualities equal to printing plates made by conventional methods.

Although there is described above specific embodiments and illustrations of the invention, many modifications may be made, and it is to be understood that it is intended by the appended claims to cover all such modifications as fall within the true spirit and scope of the invention.

What is claimed as new and desired to secure by Letters Patent of the United States is:

1. The method of making a printing plate, which method comprises forming a latent magnetic image in a member of high retentivity magnetic material, bringing said magnetically imaged member into contact with minute magnetic particles whereby said particles adhere to said member in the configuration of said image, and converting said adhering magnetic particles into a permanent ink-supporting physical representation of said magnetic image upon said member.

2. The method of making a relief-type printing plate, which method comprises forming a latent magnetic image in a plate of high retentivity magnetic material, bringing said magnetically imaged plate into contact with a mixture of minute magnetic particles and minute cementitious particles whereby said mixture of particles adhere to said plate in the configuration of said image, and temporarily heating said plate and adhering particles to bond said magnetic particles to each other and to said plate by the cementing effect of said heated cementitious particles.

3. The method of claim 1 wherein said adhering magnetic particles are utilized to carry a powdered resinous adhesive and the plate and adhering magnetic particles carrying such adhesive are heated to bond the particles together and to the magnetic plate to form a relief-type ink-supporting physical representation of said magnetic image.

4. The method of making a printing plate which method comprises forming a latent magnetic image in a member of high retentivity magnetic material, bringing said magnetically imaged member into contact with minute magnetic particles whereby said particles adhere to said member in the configuration of said image, and utilizing said adhering magnetic particles to carry a chemical etchant to the magnetic plate whereby a gravure-type ink-supporting physical representation of the magnetic image is produced by the etching action of the etchant upon the magnetic plate.

5. The method of making a gravure-type printing plate, which method comprises forming a latent magnetic image in a plate of high retentivity magnetic material, bringing said magnetically imaged plate into contact with a mixture of minute magnetic particles and minute acid anhydride particles whereby said mixture of particles adhere to said plate in the configuration of said image, and moistening said adhering mixture of particles to activate said dry acid to etch the surface of said plate in the configuration of said magnetic image.

6. The method of claim 5 wherein said high retentivity magnetic plate comprises a nickel alloy and said acid anhydride comprises anhydrous phosphoric acid.

7. The method of making a gravure-type printing plate, which method comprises forming a latent magnetic image in a plate of high retentivity magnetic metal, bringing said magnetically imaged plate into close proximity with the surface of a concentrated nitric acid suspension of minute iron particles whereby said particles are attracted out of said suspension by said image and adhere to said plate in the configuration of said image, said particles carrying nitric acid therewith to etch said metal plate.

8. The method of claim 7 wherein said metal plate comprises an alloy of nickel and said minute iron particles comprises powdered magnetite.

9. The method of making a printing plate, which method comprises forming a latent magnetic image in a metal plate of high retentivity magnetic material, temporarily bringing said magnetically imaged plate into contact with minute magnetic non-electrically conducting particles whereby said particles adhere to said plate in the configuration of said image, and electroplating a layer of metal upon the surface of said plate containing the adhering non-conducting magnetic particles whereby said electroplated layer adheres to said plate only along the surface thereof not masked by said non-conducting magnetic particles.

10. The method of claim 9 wherein the magnetic non-electrically conducting particles comprise powdered magnetite and the metal layer is electroplated to a thickness less than .001 inch to provide a lithographic type printing plate.

11. The method of claim 9 wherein the magnetic non-electrically conducting particles comprise powdered magnetite and the metal layer is electroplated to a thickness of about 0.010 inch to provide a gravure-type printing plate.

12. The method of making a lithographic type printing plate, which method comprises forming a latent magnetic image of the pictorial representation to be reproduced upon a nickel alloy plate of high retentivity magnetic material, temporarily bringing said magnetically imaged plate into contact with minute non-conducting magnetic particles whereby said particles adhere to said plate in the configuration of said image, electroplating a film of metal different from the metal alloy upon the surface of said plate containing said adhering magnetic particles, removing said non-conducting particles from within said electroplated layer, and producing a water-supporting grain in the surface of said electroplated layer.

13. The method of making a printing plate, which method comprises forming a latent magnetic image on a surface of a member of high retentivity magnetic material, bringing said magnetically imaged member into contact with minute magnetic particles whereby said particles adhere to said surface in the configuration of said image, and converting said adhering magnetic particles into a permanent ink supporting physical representation of said magnetic image on said surface of said member.

14. The method of making a printing plate, which method comprises forming a latent magnetic image in a metal plate of high retentivity magnetic material, bringing said magnetically imaged plate into contact with minute magnetic particles whereby said particles adhere to said plate in the configuration of said image, and electroplating a layer of metal upon the surface of said plate to which the magnetic particles adhere.

References Cited in the file of this patent

UNITED STATES PATENTS

| | | |
|---|---|---|
| 424,147 | Taylor et al. | Mar. 25, 1890 |
| 793,315 | McIndoe | June 27, 1905 |
| 855,105 | Henry | May 28, 1907 |
| 1,820,194 | Huebner | Aug. 25, 1931 |
| 2,035,475 | Hay | Mar. 31, 1936 |
| 2,108,822 | Lippincott | Feb. 22, 1938 |
| 2,297,691 | Carlson | Oct. 6, 1942 |
| 2,318,570 | Carlton | May 4, 1943 |
| 2,332,003 | New | Oct. 19, 1943 |
| 2,357,809 | Carlson | Sept. 12, 1944 |
| 2,530,564 | Blaney | Nov. 21, 1950 |

FOREIGN PATENTS

| | | |
|---|---|---|
| 1,010,287 | France | Mar. 19, 1952 |

OTHER REFERENCES

Jones: Printing by Magnetism, pub. 1839 in Mechanics Magazine, Vol. 31, No. 835, p. 342. (Copy available in Scientific Library.)

Atkinson et al.: Ferrography, Journal of The Franklin Institute, November 1951, Vol. 252, No. 5, pp. 373 to 381. (Copy available in Div. 17.) (101/E.S.).